United States Patent
Nakamura

(10) Patent No.: US 7,553,432 B2
(45) Date of Patent: Jun. 30, 2009

(54) INFRARED ABSORBENT, ELECTROPHOTOGRAPHIC TONER, AND IMAGE FORMING APPARATUS USING ELECTROPHOTOGRAPHIC TONER

(75) Inventor: Yasushige Nakamura, Ebina (JP)

(73) Assignee: Fuji Xerox Co., Ltd, Tokyo (JP)

( * ) Notice: Subject to any disclaimer, the term of this patent is extended or adjusted under 35 U.S.C. 154(b) by 364 days.

(21) Appl. No.: 11/061,888

(22) Filed: Feb. 22, 2005

(65) Prior Publication Data

US 2006/0019187 A1    Jan. 26, 2006

(30) Foreign Application Priority Data

Jul. 22, 2004   (JP) ............... 2004-214420

(51) Int. Cl.
*F21V 9/04* (2006.01)
*G02B 5/22* (2006.01)

(52) U.S. Cl. ............ 252/587; 252/582; 501/904

(58) Field of Classification Search ........... 252/582, 252/587; 501/904
See application file for complete search history.

(56) References Cited

U.S. PATENT DOCUMENTS

| | | | |
|---|---|---|---|
| 4,622,179 A * | 11/1986 | Eda ........................ | 540/139 |
| 4,699,863 A | 10/1987 | Sawatari et al. | |
| 4,886,721 A * | 12/1989 | Hayashida et al. ..... | 430/58.55 |
| 5,213,929 A * | 5/1993 | Takano et al. ........... | 430/78 |
| 5,736,282 A | 4/1998 | Tamura et al. | |
| 5,874,570 A | 2/1999 | Tamura et al. | |
| 6,136,488 A | 10/2000 | Kushino et al. | |
| 6,150,518 A | 11/2000 | Yamasaki et al. | |
| 6,245,472 B1 | 6/2001 | Tanaka | |
| 6,468,705 B2 * | 10/2002 | Ishimaru et al. ....... | 430/108.21 |
| 6,641,965 B2 * | 11/2003 | Nakamura et al. ..... | 430/107.1 |
| 6,803,165 B2 * | 10/2004 | Ishimaru et al. ....... | 430/108.4 |
| 7,252,914 B2 * | 8/2007 | Nakamura et al. ..... | 399/119 |
| 2001/0018156 A1 | 8/2001 | Tanaka | |
| 2003/0036011 A1 * | 2/2003 | Ebisu et al. ............ | 430/108.1 |
| 2003/0175608 A1 | 9/2003 | Takagi et al. | |
| 2003/0190544 A1 * | 10/2003 | Tanaka et al. .......... | 430/108.23 |
| 2005/0147912 A1 | 7/2005 | Takagi et al. | |

FOREIGN PATENT DOCUMENTS

| | | |
|---|---|---|
| JP | A 58-102247 | 6/1983 |
| JP | A 58-102248 | 6/1983 |
| JP | A 60-57857 | 4/1985 |
| JP | A 60-57858 | 4/1985 |
| JP | A 60-63545 | 4/1985 |
| JP | A 60-63546 | 4/1985 |
| JP | A 60-131544 | 7/1985 |
| JP | A 60-133460 | 7/1985 |
| JP | A 61-132959 | 6/1986 |
| JP | 62-121940 A | 6/1987 |
| JP | A 6-348056 | 12/1994 |
| JP | A 7-191492 | 7/1995 |
| JP | A 10-39535 | 2/1998 |
| JP | A 11-038666 | 2/1999 |
| JP | A 11-065167 | 3/1999 |
| JP | A 11-125928 | 5/1999 |
| JP | A 11-125929 | 5/1999 |
| JP | A 11-125930 | 5/1999 |
| JP | A 2000-35689 | 2/2000 |
| JP | A 2000-147824 | 5/2000 |
| JP | A 2000-155439 | 6/2000 |

* cited by examiner

*Primary Examiner*—Timothy J Kugel
(74) *Attorney, Agent, or Firm*—Oliff & Berridge, PLC

(57) ABSTRACT

The present invention provides an infrared absorbent having a light absorption peak in the infrared region and a crystallinity of 20 to 80%, an electrophotographic toner including the infrared absorbent, and an image forming apparatus having an electrophotographic image forming unit for forming a toner image on a recording medium with the electrophotographic toner and a fixing unit for fixing the toner image on the recording medium.

18 Claims, 3 Drawing Sheets

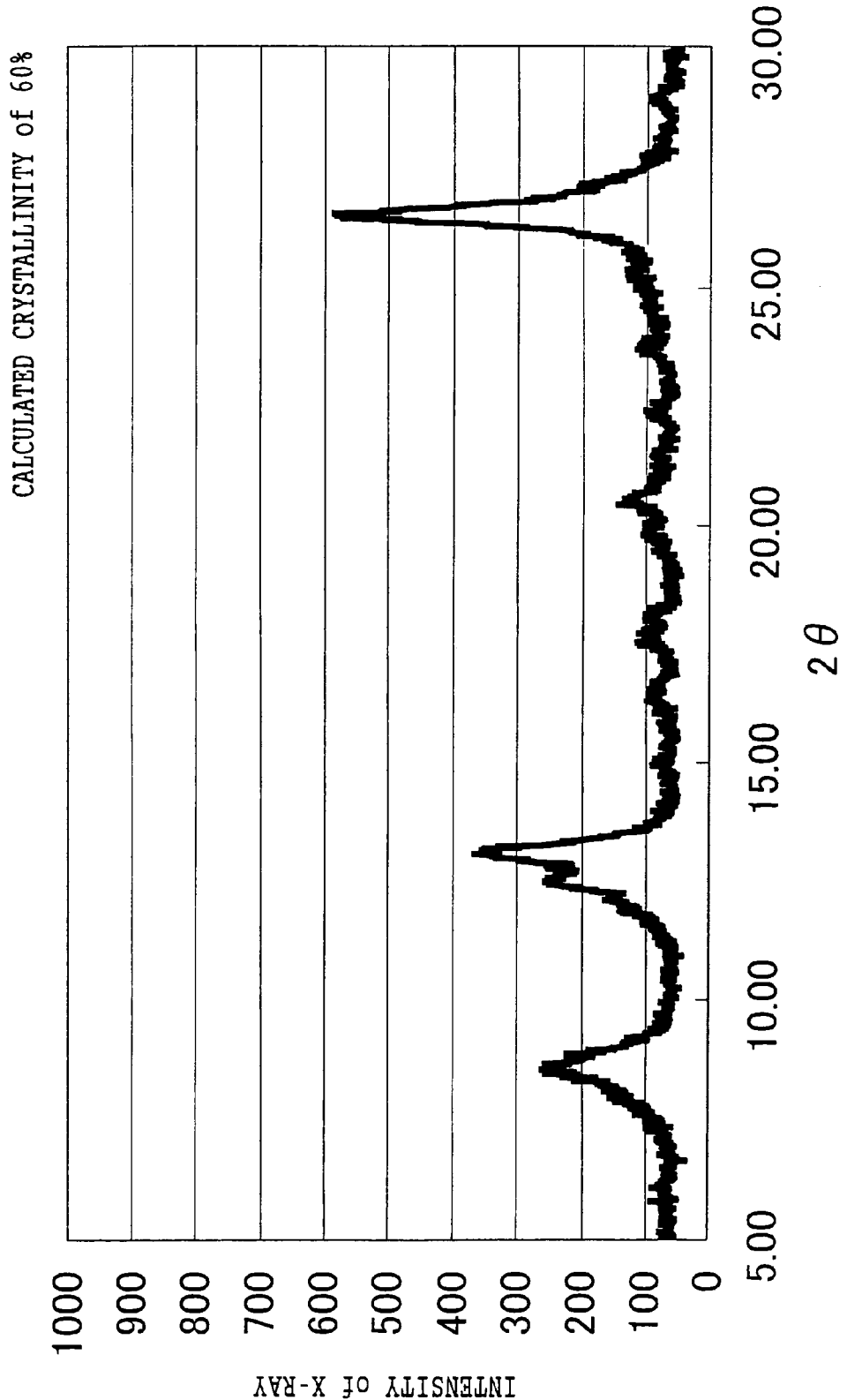

INFRARED ABSORBENT, ELECTROPHOTOGRAPHIC TONER, AND IMAGE FORMING APPARATUS USING ELECTROPHOTOGRAPHIC TONER

CROSS-REFERENCE TO RELATED APPLICATION

This application claims priority under 35 U.S.C. 119 from Japanese Patent Application No. 2004-214420, the disclosure of which is incorporated by reference herein.

BACKGROUND OF THE INVENTION

1. Field of the Invention

The present invention relates to an infrared absorbent having high light absorption efficiency, an electrophotographic toner including the infrared absorbent, and an electrophotographic image forming apparatus using the toner. More specifically, as for the toner, the invention relates to a light fixing color toner and an invisible toner and, still more specifically, to a light fixing color toner that is easy to fix and an invisible toner that is sensitive to infrared radiation.

2. Description of the Related Art

In an electrophotographic process, an electrostatic latent image is first formed. For example, a photoreceptor, or a photoconductive insulator is imagewise exposed to laser light to eliminate charge on the exposed portions thereof. An electrostatic latent image is thus formed on the photoconductive insulator in accordance with image information. Thereafter, generally, fine powder, a so-called toner, included in a developing agent is adhered to the latent image formed on the photoconductive insulator so as to make the latent image visible. Last, the resulting toner image is electrostatically transferred to a recording medium such as recording paper so as to make printed matter. For fixation of the transferred toner image, a method in which the toner is fused by pressing or heating or both of the two and the fused toner is solidified and fixed, or a method in which light energy is applied to the toner and the resulting fused toner is solidified and fixed is used. The light fixing method utilizing light, which does not cause problems that are caused by pressing or heating has drawn attention. This method is also referred to as a flash fixing method. Such a light fixing method does not require pressing a toner to fix the toner, thereby eliminating the necessity of contacting (pressing) the toner with a fixing roller. Accordingly, there is less deterioration of image resolution (reproducibility) in the fixing process than in a case where pressing is conducted.

Also, the light fixing method does not require heating by a heat source. Therefore, unlike in a heat fixing method, there is not time loss due to not being able to conduct printing from the time that a power source is turned on until a heat source such as a fixing roller is preheated to a desired temperature, and therefore printing can be conducted right after the power source is turned on. Moreover, the light fixing method requires no high-temperature heat source, whereby an increase in the internal temperature of the apparatus can be appropriately prevented.

However, when the light fixing method is used to fix a color toner, which has low light absorption efficiency, the color toner is less easily fixed than a black toner. To improve fixation of the color toner, adding an infrared absorbent to the color toner has been proposed, and many related patent applications have been published (see, for example, Japanese Patent Application Laid-Open (JP-A) Nos. 60-63545, 60-63546, 60-57858, 60-57857, 58-102248, 58-102247, 60-131544, 60-133460, 61-132959, 2000-147824, 7-191492, 2000-155439, 6-348056, 10-39535, 2000-35689, 11-38666, 11-125930, 11-125928, 11-125929, and 11-65167). These patent publications aim to achieve both colorization and light fixation by adding a material absorbing light within the infrared region to the toner as an infrared absorbent.

However, these techniques insufficiently satisfy recent technical demands, and improvement is expected.

Therefore, there is a need for an infrared absorbent having high-efficiency infrared-ray absorbing capability.

There is also a need for an electrophotographic toner including such an infrared absorbent, and specifically for a light fixing color toner with improved fixation efficiency and an invisible toner with improved sensitivity to infrared rays. Also, there is a need for an image forming apparatus using such a toner.

SUMMARY OF THE INVENTION

It is generally known that light absorption regions and intensities of coloring agents depend on their crystal structures and crystallinity even if the coloring agents have the same chemical structure. Therefore, it is thought that light absorbing abilities of infrared absorbents also depend on their crystallinity. As a result of thorough and intensive study, the inventor of the present invention has noticed that the light absorption intensity of an infrared absorbent changes when the crystallinity thereof changes and has discovered a crystallinity that is effective for infrared absorbents.

A first aspect of the invention provides an infrared absorbent having a light absorption peak in the infrared region, and a crystallinity of 20 to 80%.

A second aspect of the invention provides a method for manufacturing an infrared absorbent, including: applying pressure to infrared absorbent crystal, or dissolving an infrared absorbent in a solvent and precipitating the infrared absorbent, to adjust crystallinity of the infrared absorbent.

A third aspect of the invention provides an electrophotographic toner including the infrared absorbent.

A fourth aspect of the invention provides an image forming apparatus having an electrophotographic image forming unit for forming a toner image on a recording medium with the electrophotographic toner, and a fixing unit for fixing the toner image on the recording medium.

The invention can provide an infrared absorbent having high-efficiency infrared-ray absorbing capability. The invention can also provide an electrophotographic toner including the infrared absorbent, and specifically a light fixing color toner with improved fixation efficiency, and an invisible toner with improved sensitivity to infrared rays. The invention can provide an image forming apparatus using the toner.

BRIEF DESCRIPTION OF THE DRAWINGS

Preferred embodiments of the invention will be described in detail based on the following figures, wherein

FIG. 3 is a graph showing intensity of X-rays derived from an infrared absorbent by X-ray diffractometry.

DETAILED DESCRIPTION OF THE INVENTION

Figure 1:
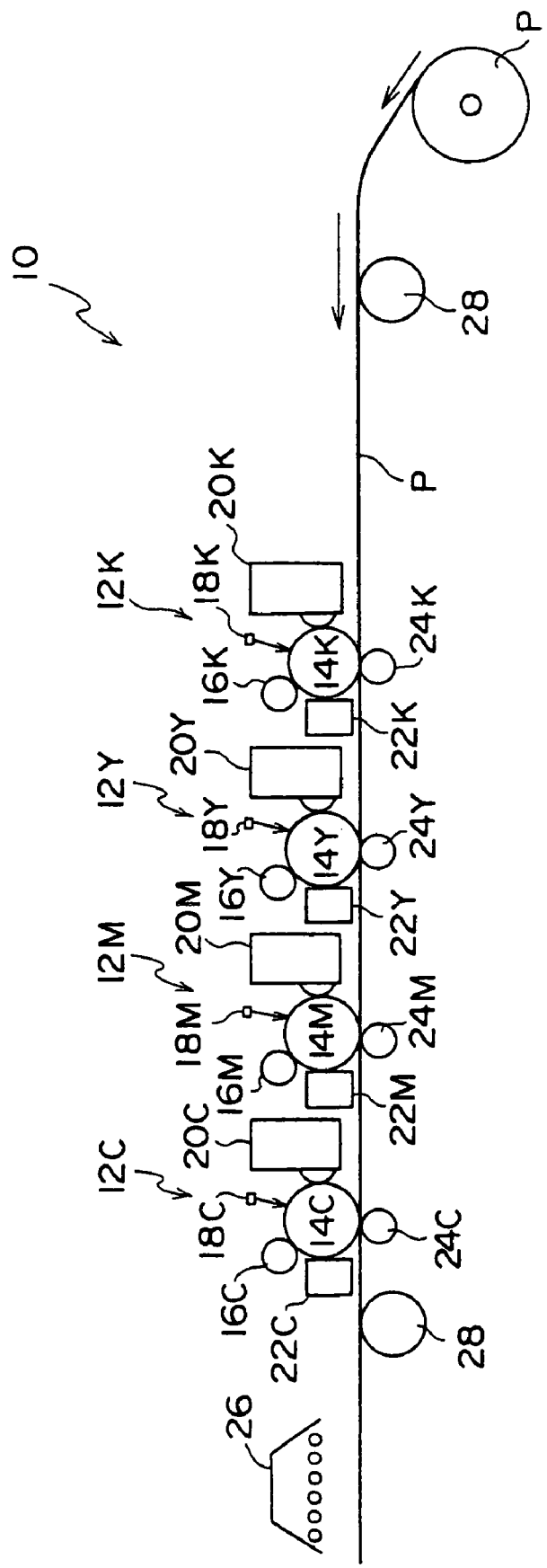
FIG. 1 is a diagram schematically showing the structure of an example of an image forming apparatus of the invention.

Hereinafter, the invention will be described in detail.

Infrared Absorbent

An infrared absorbent of the invention has a crystallinity of about 20 to about 80%, preferably about 30 to about 70%, and more preferably about 40 to about 65%. In contrast, conventional infrared absorbents have a crystallinity of 90 to 100%. The inventor of the invention has found that the infrared absorbent of the invention having a controlled crystallinity within the above-described range can work best when it is dispersed or dissolved in a resin.

More specifically, in order to make the best of the infrared absorbent's ability, there is an optimum range for the crystallinity of the infrared absorbent. When the crystallinity is higher or lower than the range, the ability of the infrared absorbent lower. The reason why the ability of an infrared absorbent having a low crystallinity lower is thought to be as follows. As the amorphous level of the infrared absorbent increases, the dispersing property of the absorbent also rises. If the dispersion level of the infrared absorbent is too high and the size of dispersed particles of the infrared absorbent becomes shorter than the wavelength of light, the infrared absorbent cannot exhibit best ability. On the other hand, the reason why the ability of an infrared absorbent having a high crystallinity lower is thought to be that the dispersing property of such an infrared absorbent in a binder of a toner lowers.

The material of the infrared absorbent of the invention is not particularly limited, but is preferably a metal naphthalocyanine compound, an aminium compound, and/or an imonium salt compound. Such substances have maximum light absorption intensity when they have a crystallinity in the range of about 20 to about 80%. Therefore, using an infrared absorbent having a crystallinity in this range, e.g., adding the absorbent to a toner, can achieve sufficient light absorption performance.

The infrared absorbent of the invention has a light absorption peak in the infrared region, and specifically has at least one light absorption peak in the near-infrared region of 750 to 2000 nm.

The crystallinity of the infrared absorbent is determined by X-ray diffractometry. The method of determining crystallinity by X-ray diffractometry will be described below.

1. Equipment Used in Analysis

Instrument for X-ray Diffraction Analysis Called "MULTIFLEX" Manufactured by RIGAKU Corporation A sample is pressed against and adhered to a glass holder for X-ray diffraction.

X-ray diffraction analysis is performed under the following conditions.

Vessel: Cu, 30 kV, 20 mA
   Goniometer: Wide-Angle Goniometer
   Scanning: 10° to 90°, 2°/minute (2θ/θ)
   Detector: SC (with Monochromator)
   Slit: DS1°, SS1°, RS 0.3 mm On the basis of the result obtained by X-ray diffraction, peak separation is performed. Then, crystallinity is calculated from integral intensity of amorphous components and that of crystalline components (X-Ray Diffractometry Handbook issued by RIGAKU Corporation, 3.62 Crystallinity Calculating Method, (2) Crystallinity Calculating Method Utilizing Peak Separation).

Hereinafter, a method of calculating the crystallinity of naphthalocyanine will be described as a specific example in detail. A sample is first pressed against and adhered to a glass holder and is subjected to wide-angle X-ray diffractometry. The resulting diffracted peaks are then separated into crystalline diffracted rays and amorphous halo patterns by using a profiling fitting technique. At this time, incoherent scattering or lattice defects are not taken into consideration. Moreover, the scanning range is such that 2θ ranges from 10° to 90°. In this range, an area derived from a crystalline diffracted ray is calculated for each of peaks whose peak areas are 1% or more of a maximum peak area. Thereby, the peaks are separated into crystalline diffracted rays and amorphous halo patterns. Crystallinity calculation by using peak separation can be automatically conducted with analytical software for X-ray powder diffraction patterns called "Jade (Version. 5)" manufactured by Materials Data. Inc. (MDI) and sold by RIGAKU Corporation.

For example, as for a diffracted ray having a strong peak around 2θ=27°, only the peak is regarded as a crystalline diffracted ray, and peaks of the diffracted ray are separated into crystalline diffracted rays and amorphous halo patterns in accordance with the above-described peak separation method. Then, areas derived from the crystalline diffracted rays and those derived from the amorphous halo patterns are calculated. Herein, the amorphous halo patterns are regarded as being in the range of 2θ=about 20° to about 30°.

Crystallinity is obtained from the areas calculated from the crystalline diffracted rays and amorphous halo patterns and equation (1) shown below.

$$\text{Crystallinity (\%)} = [\text{Areas obtained from Crystalline Diffracted Rays}/(\text{Areas obtained from Crystalline Diffracted Rays plus Areas obtained from Amorphous Halo Patterns})] \times 100 \quad \text{Equation (1)}$$

For example, when an infrared absorbent is subjected to X-ray diffactometry and X-ray intensity thereof shown in FIG. 3 is obtained, the crystallinity thereof calculated from the above-described equation is 60%.

To adjust the crystallinity of an infrared absorbent in the above range, the following measures can be adopted. For example, the crystallinity of naphthalocyanine lowers by applying pressure to crystal of naphthalocyanine. Moreover, as for a solvent-soluble material (absorbent), the crystallinity thereof can be changed by controlling a deposition speed of a solution including such a material. For example, the lower the crystallinity of an aminium or diimonium compound is, the higher the solvent evaporation speed of the solution in which the aminium or diimonium compound is dissolved in a solvent is. Therefore, the crystallinity thereof can be controlled by utilizing this fact.

The infrared absorbent of the invention can be contained in not only a light fixing toner or an invisible toner described later, but also an infrared shield for plasma display devices or a quencher of compact disks.

Toner

A toner of the invention (light fixing toner and invisible toner) (examples of the "toner of the invention" described herein include these toners, unless otherwise indicated) includes the infrared absorbent of the invention. Thereby, when the toner of the invention is a light fixing toner, it has high light fixing capability. Moreover, when the toner of the invention is an invisible toner, it has infrared detection capability.

The toner of the invention can contain two or more infrared absorbents of the invention, if necessary. Use of plural infrared absorbents is effective in extending a wavelength range of infrared rays which the toner can absorb. Moreover, the toner of the invention can also include other infrared absorbent. The total content of the infrared absorbent(s) is preferably 0.05 to 5 parts by mass with respect to 100 parts by mass of the toner.

Other infrared absorbent can be well-known one. Examples of well-known infrared absorbent other than the infrared absorbent of the invention include cyanine compounds, merocyanine compounds, benzenethiol metal complexes, mercaptophenol metal complexes, aromatic diamine metal complexes, diimonium compounds, aminium compounds, nickel metal complexes, phthalocyanine compounds, anthraquinone compounds, and naphthalocyanine compounds.

Specific examples thereof include nickel metal complexes (SIR-130 and SIR-132 manufactured by Mitsui Chemicals, Inc.), bis(dithiobenzyl)nickel (MIR-101 manufactured by Midori Kagaku, Co., Ltd.), bis[1,2-bis(p-methoxyphenyl)-1, 2-ethylenedithiolate]nickel (MIR-102 manufactured by Midori Kagaku, Co., Ltd.), tetra-n-butylammoniumbis (cis-1,2-diphenyl-1,2-ethylenedithiolate)nickel (MIR-1011 manufactured by Midori Kagaku, Co., Ltd.), tetra-n-butylammoniumbis[1,2-bis (p-methoxyphenyl)-1,2-ethylenedithiolate]nickel (MIR-1021 manufactured by Midori Kagaku, Co., Ltd.), bis(4-tert-1,2-butyl-1,2-dithiophenolate)nickel-tetra-n-butylammonium (BBDT-NI manufactured by Sumitomo Seika Chemicals, Co., Ltd.), cyanine infrared absorbents (IRF-106 and IRF-107 manufactured by Fuji Photo Film, Co., Ltd.), cyanine infrared absorbents (YKR2900 manufactured by Yamamoto Chemicals Inc.), aminium and diimonium infrared absorbents (NIR-AM1 and IM1 manufactured by Nagase Chemtex;), imonium compounds (CIR-1080 and CIR-1081 manufactured by Japan Carlit Co., Ltd.), aminium compounds (CIR-960 and CIR-961 manufactured by Japan Carlit Co., Ltd.), anthraquinone compounds (IR-750 manufactured by Nippon Kayaku Co., Ltd.), aminium compounds (IRG-002, IRG-003, and IRG-003K manufactured by Nippon Kayaku Co., Ltd.), polymethine compounds (IR-820B manufactured by Nippon Kayaku Co., Ltd.), diimonium compounds (IRG-002 and IRG-023 manufactured by Nippon Kayaku Co., Ltd.), dianine compounds (CY-2, CY-4, and CY-9 manufactured by Nippon Kayaku Co., Ltd.), soluble phthalocyanine (TX-305A manufactured by Nippon Shokubai C., Ltd.), naphthalocyanine (YKR5010 manufactured by Yamamoto Chemicals inc., and sample 1 manufactured by Sanyo Color Works, Ltd.), lanthanoid compounds (UU-HP manufactured by Shin-Etsu Chemical Co., Ltd.), and indium-tin oxide (ITO manufactured by Sumitomo Metal Industries, Ltd.). The metal naphthalocyanine compound is especially useful among these compounds, since the wavelength of its absorption peak is close to that of fusing flash emission peak at the time of flash fixing. If crystallinity of the metal naphthalocyanine can be controlled, it can improve the fixing property of a toner, or can reduce the amount necessary to achieve a sufficient effect, leading to cost reduction. The metal of the metal naphthalocyanine compound is preferably low-toxic vanadyl, aluminum, titanium, or silane. Nickel and copper have high toxicity, and therefore are not preferable.

The toner of the invention includes, other than the infrared absorbent, a binder resin, and a coloring agent, and may include any additive such as a charge control agent, wax, and/or inorganic particles.

The toner of the invention which includes a coloring agent can be used as a color toner, including a black toner. On the contrary, the toner of the invention which includes no coloring agent can be used as an invisible toner such as a toner used in infrared absorption patterns, including bar codes (toner for invisible image formation).

The binder resin preferably, mainly includes polyester and/or polyolefin. However, styrene-acrylic or methacrylic acid copolymer, polyvinyl chloride, phenol resin, acrylic resin, methacrylic resin, polyvinyl acetate, silicone resin, polyester resin, polyurethane, polyamide resin, furan resin, epoxy resin, xylene resin, polyvinyl butyral, terpene resin, coumarone-indene resin, petroleum resin, and polyether polyol resin can also be used as the binder resin. These resins can be used alone. Alternatively, two or more of these resins can be used together, or at least one of these resins can be used together with polyester and/or polyolefin. In view of durability and light-transmitting property, the binder resin is more preferably a polyester resin or a norbornene polyolefin resin. The glass transition temperature (Tg) of the binder resin is preferably about 50 to about 70° C.

The coloring agent is arbitrarily selected according to the color of a desired toner.

Examples of a coloring agent for a cyan toner include cyan pigments such as C.I. Pigment Blue 1, 2, 3, 4, 5, 6, 7, 10, 11, 12, 13, 14, 15, 15:1, 15:2, 15:3, 15:4, 15:6, 16, 17, 23, 60, 65, 73, 83, and 180, C.I.Vat Cyan 1, 3, and 20, ultramarine, cobalt blue, alkali blue lake, phthalocyanine blue, metal-free phthalocyanine blue, and partially-chlorinated phthalocyanine blue, fast sky blue, and indanthrene blue BC; and cyan dyes such as C.I. Solvent Cyan 79, and 162. Among these pigments, C.I.pigment blue 15:3 is effective as the coloring agent for a cyane toner.

Examples of a coloring agent for a magenta toner include magenta pigments such as C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48, 49, 50, 51, 52, 53, 54, 55, 57, 58, 60, 63, 64, 68, 81, 83, 87, 88, 89, 90, 112, 114, 122, 123, 163, 184, 202, 206, 207, and 209, and pigment violet 19; and magenta dyes such as C.I. Solvent Red 1, 3, 8, 23, 24, 25, 27, 30, 49, 81, 82, 83, 84, 100, 109, and 121, C.I. Disperse Red 9, C.I. Basic Red 1, 2, 9, 12, 13, 14, 15, 17, 18, 22, 23, 24, 27, 29, 32, 34, 35, 36, 37, 38, 39, and 40; red iron oxide; cadmium red; minium; mercury sulfide; cadmium; permanent red 4R; lithol red; pyrazolone red; watching red; calcium salt; lake red D; brilliant carmine 6B; eosine lake; rhodamine lake B; alizarin lake; and brilliant carmine 3B.

Examples of a coloring agent for a yellow toner include yellow pigments such as C.I. Pigment Yellow 2, 3, 15, 16, 17, 97, 180, 185, and 139.

Examples of a coloring agent for a black toner include carbon black, activated carbon, titanium black, magnetic powder, and manganese-including non-magnetic powder.

Examples of the charge control agent include known calixarene, nigrosine dyes, quaternary ammonium salts, amino group-containing polymers, metal-containing azo dyes, complex compounds of salicylic acid, phenol compounds, azo chromium compounds, and azo zinc compounds. Alternatively, the toner may include a magnetic material such as iron powder, magnetite, and/or ferrite and such a toner can be a magnetic toner. Color toners can include white magnetic powder.

The wax is most preferably ester wax, polyethylene, polypropylene, and/or ethylene-propylene copolymer, but can be other wax. Examples of other wax include polyglycerin wax, microcrystalline wax, paraffin wax, carnauba wax, sazole wax, montanic acid ester wax, deoxidized carnauba wax, palmitic acid, stearic acid, montanic acid, unsaturated fatty acids such as brassidic acid, eleostearic acid, and parinaric acid, saturated alcohols such as stearyl alcohol, aralkyl alcohol, behenyl alcohol, carnaubyl alcohol, ceryl alcohol, melissyl alcohol, and alcohol including an alkyl group whose chain is longer than that of the alkyl group of the above alcohol; polyhydric alcohols such as sorbitol, fatty acid amides such as linoleic acid amide, oleic acid amide, and lauric acid amide, saturated fatty acid bisamides such as methylenebisstearic acid amide, ethylenebiscapric acid amide, ethylenebislauric acid amide, and hexamethylenebisstearic acid amide, unsaturated fatty acid amides such as ethylenebisoleic acid amide, hexamethylenebisoleic acid amide, N,N'-dioleyladipic acid amide, and N,N'-dioleylsebacic acid amide, aromatic bisamides such as m-xylenebisstearic acid amide, and N,N'distearylisophthalic acid amide, salts of fatty acids (generally called as metallic soap) such as calcium stearate, calcium laurate, zinc stearate, and magnesium stearate, waxes obtained by graft-copolymerizing at least one vinyl monomer, such as styrene or acrylic acid, and an aliphatic hydrocarbon wax, partially-esterified compounds of fatty acids, such as behenic acid monoglyceride, and polyhydric alcohol, and methyl ester compounds containing a hydroxyl group obtained by hydrogenating vegetable fat and oil. When differential scanning calorimetry (DSC) is conducted in the invention, it is preferable to use a highly precise differential scanning calorimeter of an internal heat and input compensation type in view of measurement principle.

The inorganic fine particles are added to the toner for the purpose of improvement in toner flowability, and are preferably white. The mixing ratio of the inorganic fine particles to the toner is about 0.01 to about 5 parts by mass, and preferably about 0.01 to about 2.0 parts by mass with respect to 100 parts by mass of the toner.

Examples of the inorganic fine particles (inorganic fine powder) include silica fine powder, alumina, titanium oxide, barium titanate, magnesium titanate, calcium titanate, strontium titanate, zinc oxide, silica sand, clay, mica, wollastonite, diatomaceous earth, chromium oxide, ceric oxide, red iron oxide, antimony trioxide, magnesium oxide, zirconium oxide, barium sulfate, barium carbonate, calcium carbonate, silicone carbide, and silicone nitride. The inorganic fine particles are most preferably silica fine powder. The toner of the invention may also contain a combination of silica, and titanium, resin fine powder, and alumina. The toner of the invention may also contain, as a cleaning activator, a metal salt of a higher fatty acid such as zinc stearate, and/or inorganic fine particles (fine particle powder) of a fluorinated polymer.

In manufacturing the toner of the invention, a generally used kneading and grinding method, or a wet granulation method can be conducted.

Examples of the wet granulation method include a suspension polymerization method, an emulsion polymerization method, an emulsion polymerization association method, a soap-free emulsion polymerization method, a non-aqueous dispersion polymerization method, an in-situ polymerization method, an interfacial polymerization method, and an emulsion dispersion granulation method.

Specifically, for example, a binder resin, wax, a charge control agent, a coloring agent, a magnetic substance, an infrared absorbent, and any other additive are sufficiently mixed with each other with a mixer such as a Henschel mixer or a ball mill. Then, the mixture is melted and kneaded with a heat kneader such as a heating roll, a kneader, or an extruder. As a result, the metal compound, coloring agent, and magnetic substance are dispersed or dissolved in the resultant sufficiently mixed and melted resin. The resultant is cooled down and solidified, and then ground and classified to prepare a toner or toner mother particles. The pigment or infrared absorbent may be used in the form of masterbatch.

Here, if required, any desired additive may be fully mixed with the toner mother particles with a mixer such as a Henschel mixer to produce a toner of the invention used to develop electrostatic charge images.

Here, the infrared absorbent may be dispersed (or dissolved) in the toner, or adhered to or firmly fixed on the surface of the toner.

In order to firmly fix the infrared absorbent on the surface of the toner, a surface modification device can be used. Examples thereof include a device which gives a shock to toner particles in a high-speed air flow, such as SURFUSING system (manufactured by Nippon Pneumatic Mfg Co., Ltd.), a hybridization system (manufactured by Nara Machinery Co., Ltd.), KRYPTRON COSMOS series (manufactured by Kawasaki Heavy Industries, Ltd.), and INOMIZER system (manufactured by Hosokawamicron Corporation), a device which implements an applied dry mechanochemical method such as MECHANOFUSION system (manufactured by Hosokawamicron Corporation), and MECHANOMILL (manufactured by Okada Seiko Co., Ltd.), and a device which implements an applied wet coating method such as DISPERCOAT (manufactured by Nisshin Engineering Inc.), and COATMIZER (manufactured by Freund Corporation). Two or more of these devices are used together.

The toner of the invention preferably has a volume average particle size Dv of about 3 to about 10 μm, and more preferably about 4 to about 8 μm. The ratio of the volume average particle size Dv to a number average particle size Dp (Dv/Dp) is preferably in the range of about 1.0 to about 1.25. By using toner particles having a small and uniform size as described above, unevenness of the charging property of the toner is prevented. Thereby, fogging in the resulting images can be suppressed, and the fixing property of the toner is also improved. Moreover, reproducibility of narrow lines and dots in the resulting images can also be improved.

The toner of the invention preferably has an average degree of roundness of about 0.955 or more, and more preferably about 0.960 or more. Moreover, the toner of the invention preferably has standard deviation of degree of roundness of about 0.040 or less, and more preferably about 0.038 or less. When the toner of the invention has such an average degree of roundness and standard deviation of degree of roundness, toner particles can be densely overlaid on a recording medium, and the resultant toner layer on the recording medium can be therefore thin, resulting in improved fixation. As described, by making the toner shape uniform, fogging in the resulting images can be suppressed, and reproducibility of narrow lines and dots can be improved.

The toner of the invention may be used as a one-component developer or can be used together with a carrier as a two-component developer. Moreover, the toner of the invention may be magnetic or non-magnetic. The carrier may be known magnetite, ferrite, and/or iron powder. When the carrier has a coating, the coating agent is preferably a silicone compound.

Image Forming Apparatus

The image forming apparatus of the invention has an electrophotographic image forming unit for forming a toner image on a recording medium with the toner of the invention, and a fixing unit for fixing the toner image on the recording medium. The image forming apparatus of the invention can be the same as a known electrophotographic image forming apparatus, except that the toner of the invention is used to form the toner image.

The fixing unit can be light fixing unit. In this case, the fixing unit can be a light source. Examples of the light source include a halogen lamp, a mercury lamp, a flash lamp, and an infrared laser. However, the light source is most preferably a flash lamp, because the lamp can instantaneously fix toner images and save energy. The emitted light energy of the flash lamp is preferably in the range of about 1.0 to about 0.70 J/cm$^2$, and more preferably in the range of about 2 to about 5 J/cm$^2$.

Here, the energy of flash received per unit area, which indicates intensity of xenon lamp, is expressed by the following equation (2).

$$S = ((1/2) \times C \times V^2)/(u \times L) \times (n \times f) \qquad \text{(Equation 2)}$$

The number of lamps flashing at once: n
Flash Frequency: f(Hz)
Input Voltage: V(V)
Condenser Capacity: C(F)
Process Conveying Speed: u(cm/s)
Effective Flash Width of Flash Lamp (generally maximum paper width): L(cm)
Energy Density: S(J/cm$^2$)

The light fixing method in the invention can be a delay method in which flash lamps are turned on one by one. In this delay method, flash lamps are arranged, and these lamps are turned on one by one at time intervals in the range of about 0.01 to about 100 miliseconds, and the same portion of an image is irradiated plural times. In this method, in order to provide the toner image with necessary light energy, the toner image is irradiated plural times rather than being irradiated only once. Therefore, light energy per flashing can be lower in this method than in a fixing method in which light energy is supplied only once. Thereby, the delay method can achieve both void suppression and improved fixing property.

As described above, in a case where a toner image is irradiated plural times, the emitted light energy of the plural flash lamps is the sum of emitted light energy applied to a unit area per flashing.

In the invention, the number of flash lamps is preferably 1 to 20, and more preferably 2 to 10. The time interval from one lamp's flashing to the next lamp's flashing is preferably in the range of about 0.1 to about 20 miliseconds, and more preferably in the range of about 1 to about 3 miliseconds.

Moreover, the emitted light energy of a flash lamp per flashing is preferably in the range of about 0.1 to about 2.5 J/cm$^2$, and more preferably in the range of about 0.4 to about 2 J/cm$^2$.

When an invisible toner is used in the image forming apparatus of the invention, the fixing unit is not restricted to the light fixing unit, and may be an oven or a heating roll.

Hereinafter, while referring to drawings, an embodiment of the image forming apparatus of the invention will be explained. FIG. 1 is a diagram showing the schematic structure of the embodiment.

An image forming apparatus 10 shown in FIG. 1 has a paper feeding roller 28 which unrolls a rolled recording medium P and feeds the unrolled recording medium P to an image forming zone. In the image forming zone, a black image forming unit 12K, a yellow image forming unit 12Y, a magenta image forming unit 12M, and a cyan image forming unit 12C are provided in series in this order from an upstream side to a downstream side in the feeding direction of the recording medium P. On the downstream side of the cyan image forming unit 12C, a fixing unit 26 having flash lamps is provided.

The black image forming unit 12K is a known electrophotographic device. Specifically, the black image forming unit 12K has a photoreceptor 14K, and has an electrifier 16K, a light exposure subunit 18K, a developing subunit 20K, and a cleaner 22K around the photoreceptor 14K. The black image forming unit 12K also has a transfer subunit 24K which is opposite the photoreceptor 14K with respect to the recording medium P. The other image forming units 12Y, 12M, and 12C have the same structure as that of the black image forming unit 12K.

The photoreceptor 14 (14K, 14Y, 14M, and 14C) may be an inorganic photoreceptor including an inorganic substance such as amorphous silicone or selenium, or an organic photoreceptor including an organic substance such as polysilane or phthalocyanine. However, the photoreceptor especially preferably includes amorphous silicone because of its long life.

The fixing unit 26 may include flash lamps, such as xenon lamps, neon lamps, argon lamps, or krypton lamps. The light fixing energy is preferably in the range of about 3.0 to about 7.0 J/cm$^2$, as described above.

In the image forming apparatus 10 of FIG. 1, toner images are transferred from the image forming units 12K, 12Y, 12M, and 12C to the unrolled recording medium P one by one in accordance with a known electrophotographic method. The resulting full-color toner image is then optically fixed with the fixing unit 26 to form an image.

The light emission peak of the light source serving as the light fixing unit and the wavelength range of light to which a sensor used to read invisible images such as infrared absorption patterns is most sensitive depend on the types of the light source and sensor. Therefore, different light source and sensor require different optimum light absorption characteristics in the near-infrared range for an infrared absorbent. However, the light absorption characteristics of the infrared absorbent of the invention in the near-infrared range can be easily adjusted by controlling the molecular structure of the infrared absorbent.

EXAMPLES

Hereinafter, the invention will be explained in more detail while referring to examples.

1. Manufacture of Toner

Toner

A composition for a toner shown in Table 1 are put into a Henschel mixer and preliminarily mixed. The resulting mixture is melted and kneaded with a kneader PCM-30 manufactured by Ikegai Company, roughly milled by a hammer mill, and then finely milled by a jet mill. The resultant particles are classified with an airflow classifier. Thus, a toner is obtained. In Table 1, toners T-1S and T-6S are invisible toners, and the other toners are color toners.

Herein, an infrared absorbent 1 (Vanadylnaphthalocyanine "YKR5010" manufactured by Yamamoto Chemicals Inc.), and an infrared absorbent 2 (aminium "IRG0003K" manufactured by Nippon Kayaku Co., Ltd.) are subjected to the following process to change their crystallinity. Tables 2 and 3 show the crystallinities of these infrared absorbents which have been subjected to such a process.

The crystallinity of naphthalocyanine serving as the infrared absorbent is reduced by putting 50 g of the commercially available infrared absorbent and ten iron balls each having a diameter of 2 cm into a plastic bottle having a volume of 1000 cc and stirring them. The crystallinity of naphthalocyanine (YKR5010 manufactured by Yamamoto Chemicals Inc.) which has not been processed is 96. Five portions of naphthalocyanine are stirred with a ball mill at 100 rpm for 0.5, 3, 10, 50, and 150 hours, respectively. As a result, the crystallinity of naphthalocyanine which has been stirred for 150 hours is changed from 96 to 12 (see Table 2). The crystallinity of aminium is changed by dissolving 5 g of aminium in 100 ml of chloroform which dissolves aminium, and changing the evaporation speed of the resultant solution. Specifically, six solutions which are the same are prepared and the temperatures thereof are controlled so that the evaporation speeds, or the evaporation times, are adjusted to different values in the range of one minute to one week. The resultant aminium has a crystallinity in the range of 15 to 99 (see Table 3).

TABLE 1

Toner Composition

| TONER No. | INFRARED ABSORBENT TYPE | INFRARED ABSORBENT ADDITION AMOUNT (wt %) | BINDER RESIN (mass %) | CHARGE CONTROL AGENT QUATERNARY AMMONIUM SALT (mass %) | WAX CERI-DUST (mass %) | PIGMENT (mass %) CYAN PIGMENT | PIGMENT (mass %) MAGENTA PIGMENT | PIGMENT (mass %) YELLOW PIGMENT | CARBON | EXTERNAL ADDITIVE SILICA (mass %) | REMARKS |
|---|---|---|---|---|---|---|---|---|---|---|---|
| T-1M | M-1 | 1 | 91.5 | 1 | 1 | 0 | 5 | 0 | 0 | 0.5 | Comparative example |
| T-2M | M-2 | 1 | 91.5 | 1 | 1 | 0 | 5 | 0 | 0 | 0.5 | Example |
| T-3M | M-3 | 1 | 91.5 | 1 | 1 | 0 | 5 | 0 | 0 | 0.5 | Example |
| T-4M | M-4 | 1 | 91.5 | 1 | 1 | 0 | 5 | 0 | 0 | 0.5 | Example |
| T-5M | M-5 | 1 | 91.5 | 1 | 1 | 0 | 5 | 0 | 0 | 0.5 | Comparative example |
| T-6M | M-6 | 1 | 91.5 | 1 | 1 | 0 | 5 | 0 | 0 | 0.5 | Comparative example |
| T-7M | IRG-1 | 1 | 91.5 | 1 | 1 | 0 | 5 | 0 | 0 | 0.5 | Comparative example |
| T-8M | IRG-2 | 1 | 91.5 | 1 | 1 | 0 | 5 | 0 | 0 | 0.5 | Example |
| T-9M | IRG-3 | 1 | 91.5 | 1 | 1 | 0 | 5 | 0 | 0 | 0.5 | Example |
| T-10M | IRG-4 | 1 | 91.5 | 1 | 1 | 0 | 5 | 0 | 0 | 0.5 | Example |
| T-11M | IRG-5 | 1 | 91.5 | 1 | 1 | 0 | 5 | 0 | 0 | 0.5 | Example |
| T-12M | IRG-6 | 1 | 91.5 | 1 | 1 | 0 | 5 | 0 | 0 | 0.5 | Comparative example |
| T-1S | M-1 | 0.1 | 97.4 | 1 | 1 | 0 | 0 | 0 | 0 | 0.5 | Comparative example |
| T-6S | M-6 | 0.1 | 97.4 | 1 | 1 | 0 | 0 | 0 | 0 | 0.5 | Example |
| T-3C | M-3 | 1 | 93.5 | 1 | 1 | 3 | 0 | 0 | 0 | 0.5 | Example |
| T-3Y | M-3 | 1 | 88.5 | 1 | 1 | 0 | 0 | 8 | 0 | 0.5 | Example |
| T-3B | NONE | 0 | 92.5 | 1 | 1 | 0 | 0 | 0 | 5 | 0.5 | Comparative example |

Magenta Pigment: Pigment Violet 19 (HOSTAPERM RED E2B70 manufacture by Clariant)
Cyan Pigment: Pigment Blue 15:3 (BLUE No. 4 manufactured by Dainichiseika Color and Chemicals Mfg)
Yellow Pigment: Pigment Yellow 185 (PALIOTOL Y-D1155 manufactured by BASF)
Carbon Black: NIPEX 35 manufactured by Degussa
Binder Resin: Cycloolefin Resin (TOPAS TM manufactured by Ticona)
Charge Control Agent: Quaternary Ammonium Salt (PSY manufactured by Clariant)
Wax: Polyethylene (CERIDUST 2051 manufactured by clariant)
External Additive: Silica (TG820F manufactured by Cabot)

TABLE 2

Infrared absorbents 1 with Different Crystallinities

| | | Crystallinity (%) | Remarks |
|---|---|---|---|
| Infrared absorbent 1 | M-1 | 12 | Comparative example |
| | M-2 | 42 | Example |
| | M-3 | 60 | Example |
| | M-4 | 80 | Example |
| | M-5 | 88 | Comparative example |
| | M-6 | 96 | Comparative example |

Infrared absorbent 1
(Vanadylnaphthalocyanine "YKR5010" manufactured by Yamamoto Chemicals Inc.)

TABLE 3

Infrared absorbents 2 with Different Crystallinities

| | | Crystallinity (%) | Remarks |
|---|---|---|---|
| Infrared absorbent 2 | IRG-1 | 15 | Comparative example |
| | IRG-2 | 30 | Example |
| | IRG-3 | 42 | Example |
| | IRG-4 | 56 | Example |
| | IRG-5 | 78 | Example |
| | IRG-6 | 99 | Comparative example |

Infrared absorbent 2
Aminium: "IRG0003K (Manufactured by Nippon Kayaku")

2. Manufacture of Developer

Manufacture of Developer

A carrier to be mixed with each of the above toners is carrier particles having a size of 60 μm and coated with a cross-linked fluorine-modified silicone resin (DC27 manufactured by Powder Tech Company). Six parts by mass of each toner and 94 parts by mass of the carrier are mixed with a ball mill having a volume of ten liter for two hours to obtain seven kg of a developer.

3. Toner Printing Test Using Flash Printer

Color Toner Evaluation

Each of developers including the color toner is set in an image forming apparatus which can optically fix an image, and a square image having an edge of one inch (2.54 cm×2.54 cm) is formed on plain paper (NIP-1500LT manufactured by Kobayashi Kirokushi Co., Ltd.) serving as a recording medium with the image forming apparatus. The amount of each of cyan, magenta, yellow, black, and invisible toners is adjusted to 0.6 mg/cm².

The image forming apparatus has a structure shown in FIG. 1, and is a remodeled device in which CF1100 printer manufactured by Fuji Xerox Co., Ltd. has been modified such that xenon flash lamps having strong flash intensity in a wavelength range of 700 to 1500 nm are provided therein as a light fixing unit. In the apparatus, a delay light emission method is adopted which conducts flashing three times per unit area. In the delay light emission method, light energy of each flash is the same, and the time interval between first flashing and second flashing is one millisecond, and that between the second flashing and third flashing is 0.5 milliseconds. The total emitted light energy is 4 J/cm².

The fixing rate of the square image having an edge of one inch is evaluated as follows. The optical density (OD1) of the image is first measured. An adhesive tape (SCOTCH MENDING TAPE manufactured by Sumitomo 3M Limited) is stuck on the image, and peeled off. The optical density (OD2) of the image is then measured. These optical densities are measured with a spectral color meter (X-Rite 938 manufactured by X-Rite Inc.) meeting conditions stipulated in STATUS A of ANSI standard and a light source D50 at 2° (white backing)

The fixing rate is calculated from the following equation (3) and the measured optical densities.

$$\text{Fixing Rate (\%)} = OD2/OD1 \times 100 \quad \text{Equation (3)}$$

Evaluation of Fixing Property

A: 90% or more
B: 70 to 89%
C: 69% or lower, which is not at a practical level

Figure 2:
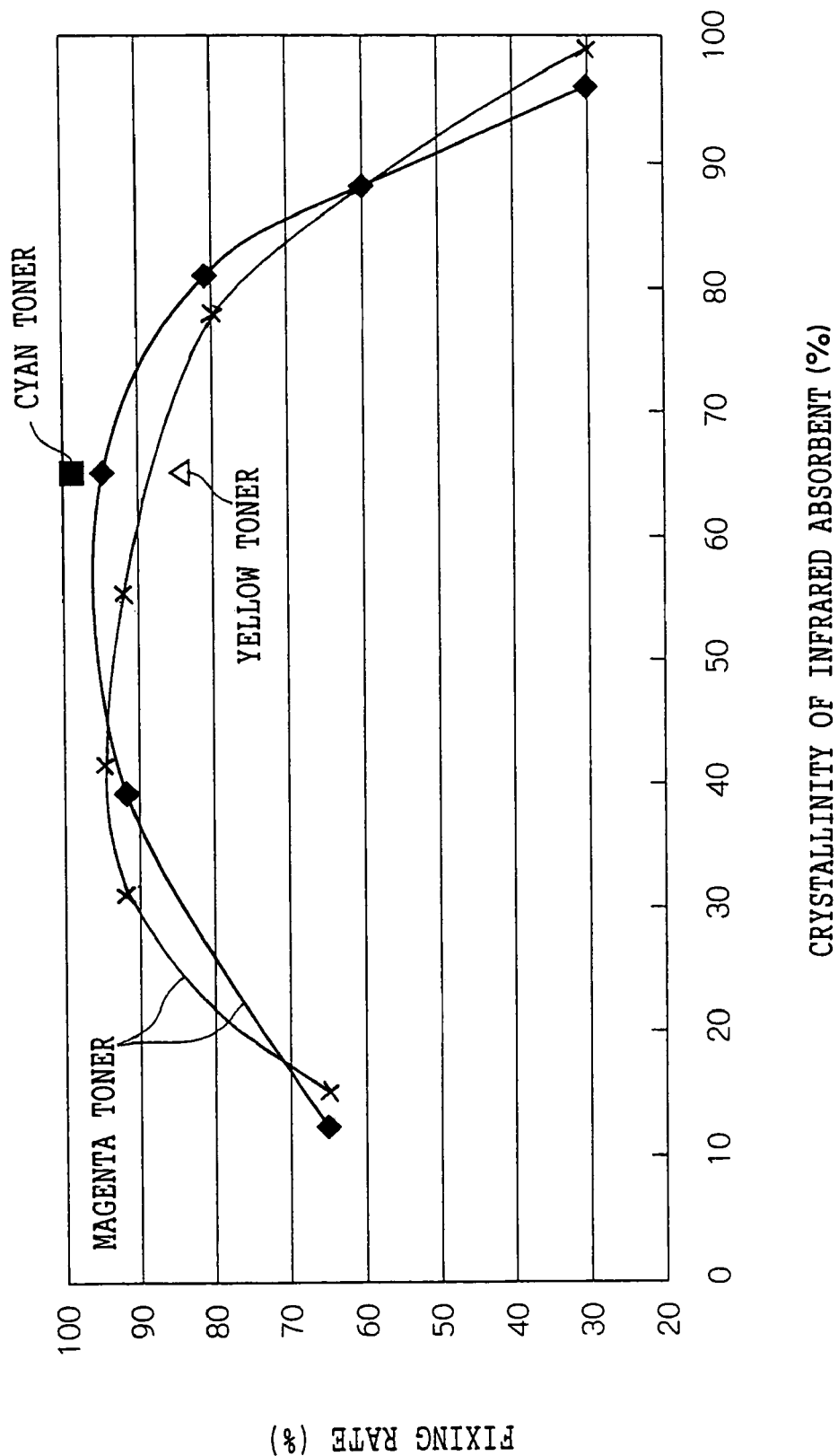
FIG. 2 is a graph showing the relationship between crystallinities and fixing rates of infrared absorbents.

The evaluation results of fixing property is shown in Table 4 and FIG. 2.

TABLE 4

Evaluation Results of Flash Toners

| TONER No. | FIXING RATE (%) | DETER-MINA-TION | CRYSTALLINITY OF INFRARED ABSORBENT (%) | REMARKS |
|---|---|---|---|---|
| T-1M | 65 | C | 12 | Comparative example |
| T-2M | 92 | A | 42 | Example |
| T-3M | 95 | A | 60 | Example |
| T-4M | 81 | B | 80 | Example |
| T-5M | 60 | C | 88 | Comparative example |
| T-6M | 30 | C | 96 | Comparative example |
| T-7M | 65 | C | 15 | Comparative example |
| T-8M | 92 | B | 30 | Example |
| T-9M | 95 | A | 42 | Example |
| T-10M | 92 | A | 56 | Example |
| T-11M | 80 | B | 78 | Example |
| T-12M | 30 | C | 99 | Comparative example |
| T-3C | 99 | B | 65 | Example |
| T-3Y | 85 | B | 65 | Example |
| T-3B | — | | | |

From Table 4, it is found that the color toners including an infrared absorbent having a controlled crystallinity within a desired range have good fixing property. All the images obtained are checked by naked eyes, and it is found that the images have high quality and that the level of stain such as fogging in the background portion of each image is low.

Invisible Toner Evaluation

Each of the invisible toners obtained is set in an image forming apparatus which can thermally fix an image, and an invisible image (bar code) is formed on plain paper serving as a recording medium with the image forming apparatus. The image forming apparatus is a printer having a heat roller as a heat fixing unit (DOCUCENTRE 402FS manufactured by Fuji Xerox Co., Ltd.).

In order to read the bar code, a bar code reader THLS-6000 or TBR-6000 manufactured by Tohken Co., Ltd. and having, as a light source, a laser which emits light having a wavelength of 780 nm, an infrared ray-emitting diode GL480 serving as a light source, manufactured by SHARP Corporation, and having a peak light-emission wavelength of 950 nm, and a photodiode PD413PI serving as a light receptor and manufactured by SHARP Corporation, and a peak light-receiving wavelength of 960 nm are used. A check is made to determine whether the bar code can be read.

Reading test is performed ten times for each barcode. When the bar code reader can read a bar code ten times, the toner contained in the bar code is evaluated as "A" in Table 5. When the bar code reader cannot read a bar code at least once, the toner contained in the bar code is evaluated as "B".

TABLE 5

Evaluation Results of Invisible Toners

| Toner No. | Signal Detection |
|---|---|
| T-1S | A |
| T-6S | B |

From Table 5, it is found that the bar code made of the invisible toner including an infrared absorbent which has controlled crystallinity within a desired range can be easily read. The bar code area of the recording medium is checked by naked eyes and is found to be almost colorless and almost transparent.

What is claimed is:

1. A method for forming a modified infrared absorbent having a light absorption peak in the infrared region and a crystallinity of from 20 to 80%, the method comprising:
    adjusting the crystallinity of an original infrared absorbent that is at least one of a metal naphthalocyanine compound, an aminium compound and an immonium salt compound, by applying pressure to the original infrared absorbent or dissolving the original infrared absorbent in a solvent and precipitating the modified infrared absorbent while controlling a deposition speed thereof.

2. The method for forming a modified infrared absorbent according to claim 1, wherein the light absorption peak is in a range of from 750 to 2000 nm.

3. The method for forming a modified infrared absorbent according to claim 1, wherein the crystallinity is from 30 to 70%.

4. The method for forming a modified infrared absorbent according to claim 1, wherein the crystallinity is from 40 to 65%.

5. The method for forming a modified infrared absorbent according to claim 1, wherein the metal naphthalocyanine compound includes a metal selected from the group consisting of vanadium, aluminum, titanium, and silane.

6. The method for forming a modified infrared absorbent according to claim 1, wherein the crystallinity of the original infrared absorbent is adjusted by applying pressure to the original infrared absorbent.

7. A method of forming an electrophotographic toner including forming a modified infrared absorbent having a light absorption peak in the infrared region and a crystallinity of from 20 to 80%, the method comprising:

adjusting the crystallinity of an original infrared absorbent that is at least one of a metal naphthalocyanine compound, an aminium compound and an immonium salt compound, by applying pressure to the original infrared absorbent or dissolving the original infrared absorbent in a solvent and precipitating the modified infrared absorbent while controlling a deposition speed thereof.

8. The method of forming an electrophotographic toner according to claim 7, wherein the toner is a color toner for flash fusing.

9. The method of forming an electrophotographic toner according to claim 7, wherein the toner is an invisible toner.

10. The method of forming an electrophotographic toner according to claim 7, wherein the amount of the modified infrared absorbent in the toner is from 0.05 to 5 parts by mass with respect to 100 parts by mass of the toner.

11. The method of forming an electrophotographic toner according to claim 7, wherein the crystallinity of the original infrared absorbent is adjusted by applying pressure to the original infrared absorbent.

12. A method for forming a toner image on a recording medium with an electrophotographic toner including forming a modified infrared absorbent having a light absorption peak in the infrared region and a crystallinity of from 20 to 80%, the method comprising:

adjusting the crystallinity of an original infrared absorbent that is at least one of a metal naphthalocyanine compound, an aminium compound and an immonium salt compound, by applying pressure to the original infrared absorbent or dissolving the original infrared absorbent in a solvent and precipitating the modified infrared absorbent while controlling a deposition speed thereof; and fixing the toner image on the recording medium.

13. The method for forming a toner image on a recording medium according to claim 12, wherein the fixing unit performs flash fusing, which optically fixes the toner image with a flash lamp.

14. The method for forming a toner image on a recording medium according to claim 13, wherein the fixing unit comprises a plurality of the fusing flashs, and performs a delayed light emission flash fusing using the plurality of the flash lamps which emit light at a time interval.

15. The method for forming a toner image on a recording medium according to claim 14, wherein the time interval of flashing between each flash lamp is in a range of from 0.1 to 20 msec.

16. The method for forming a toner image on a recording medium according to claim 15, wherein the emitted light energy of the flash lamp is in a range of from 1.0 to 7.0 $J/cm^2$.

17. The method for forming a toner image on a recording medium according to claim 15, wherein the emitted light energy of the flash lamp is in a range of from 2.0 to 5.0 $J/cm^2$.

18. The method for forming a toner image on a recording medium according to claim 12, wherein the crystallinity of the original infrared absorbent is adjusted by applying pressure to the original infrared absorbent.

* * * * *